United States Patent Office 2,766,312
Patented Oct. 9, 1956

2,766,312
PROCESS FOR POLYMERIZING OLEFINS

George E. Serniuk, Roselle, N. J., assignor to Esso Research and Engineering Company, a corporation of Delaware No Drawing. Application August 19, 1952,
Serial No. 305,310

12 Claims. (Cl. 260—683.15)

The present invention relates to the continuous polymerization of olefins employing a catalyst system comprising boron trifluoride, a polar compound and an oxide of a left-hand metal of group IV of the periodic table.

It is known to polymerize low molecular weight olefins into polymers of varying molecular weight by means of boron halides in the presence of various polar compounds such as water, alcohols, ethers, and the like. Such compositions are fairly active catalysts, particularly in batch polymerization operations. However, they lose activity rapidly with time, either because the $BF_3$ is lost by dissociation of the catalyst or because the catalyst reacts with the products of the reaction to form catalyst-hydrocarbon complexes which are catalytically inactive under the original conditions imposed. In other cases, the catalyst alters the nature of the product by causing the polar compound to add thereto, or the polymers produced are of sufficiently high molecular weight to be classed as high polymers.

It has also been proposed to polymerize olefins in a batch system employing boron trifluoride in conjunction with oxides of alumina, silica and the like. Long contact times have been used and extremely high molecular weight polymers are produced. These systems are not adaptable to continuous operations under moderate reaction conditions because catalyst activity can not be maintained at a high level for a sufficient length of time to make the process economically feasible.

It is an object of this invention to provide a continuous polymerization process employing a modified catalyst system which is capable of converting olefins, particularly the low molecular weight olefins, into polymer gasoline or into chemical intermediates under moderate conditions of temperature and pressure. It is a further object of the present invention to provide a process that is capable of operation for extended periods of time without severe loss of activity and in which catalyst activity can be maintained at high levels by suitable embodiments of the invention.

In accordance with the present invention, a reaction zone is supplied with a finely divided oxide of a left hand metal of group IV of the periodic system, the oxide being used alone or in admixture with or deposited on other finely divided, relatively inert solids. Olefin feed is passed into contact with the finely divided solid while continuously introducing boron trifluoride and polar compound into the reaction zone whereby substantial polymerization takes place. It has been found that the boron trifluoride and polar compound must be introduced continuously in order to maintain catalyst activity. Depositing the boron trifluoride and polar compound on the oxide gives very poor conversions at the short contact times employed, and, furthermore, the activity of such a system is low initially, or after a relatively short period.

The metal oxides employed in the practice of the present invention include the oxides of titanium, zirconium, hafnium or thorium, or mixtures of these, but titanium is greatly preferred. These oxides include $TiO$, $Ti_2O_3$, $TiO_2$, $ZrO_2$, $HfO_2$, $ThO_2$, etc.

These oxides may be used alone in finely divided form or may be physically mixed with finely divided spacing materials such as activated charcoal, clays, silica gel or other relatively inert solids. The oxide may also be deposited on a suitable supporting material such as one of the above-mentioned solids. It is preferred that the total solid mixture contain at least 5 weight percent of the active metal oxide, more preferably above about 20 weight percent of this oxide. The finely divided metal oxide may be disposed in a reaction zone as a fixed bed, or it may be suspended in a fluid medium such as the gaseous or liquid reactants undergoing reaction or it may be used by other procedures known to the art for handling solid catalysts.

The olefin feed is charged to the reaction zone at a feed rate in the range of about 0.05 to 10 liquid volumes of feed per volume of solid per hour (liq. v./v./hr.), feed rates in the range of about 0.1 to 5 liquid v./v./hr. generally being preferred for obtaining substantial olefin conversion. The process has particular application to the polymerization of the lower molecular weight olefinic hydrocarbons such as propylene, butylenes, pentenes, hexenes and their mixtures. Ethylene generally undergoes very little reaction under low pressure conditions, but it may be a component of the olefin feed stock. The system is also applicable to higher molecular weight monoolefins such as the octenes, styrene, indene and the like and also for polymerizing diolefins such as butadiene and other types of unsaturated aliphatic hydrocarbons. The feed may contain paraffinic diluents and/or inert gaseous diluents such as nitrogen and the like. Olefin concentrations in the feed may vary widely such as from about 20% based on the total feed up to substantially 100% concentrations.

The amount of boron fluoride continuously charged to the reaction zone may vary over a rather wide range, depending upon reaction temperature and other reaction conditions as well as the type of olefin being polymerized. A $BF_3$ rate in the range of about 0.1 to 50 gaseous volume per volume of solid per hour (gas v./v./hr.) will generally be suitable. A preferred $BF_3$ rate is in the range of about 2 to 30 gas v./v./hr. The boron fluoride is generally introduced into the reaction zone in gaseous form. It may be injected along with a portion of the dry olefin feed, or separately through a distribution means designed to distribute it throughout the reaction zone in intimate contact with the metal oxide. In other modifications, it may be continuously introduced, totally or in part, as a complex with the polar compound that is an essential ingredient of the catalyst system as will be defined below.

The polar compound employed in the catalyst system is one that is capable of forming a complex with the boron fluoride. Polar compounds containing an active hydrogen are generally preferred. These include water; alcohols, particularly aliphatic alcohols, such as ethyl alcohol, propyl alcohols, butyl alcohols etc.; phenol; alkyl phenols such as ethyl phenols; carboxylic acids such as formic acid, acetic acid; and the like. The lower molecular weight polar organic compounds, such as those having below about 10 carbon atoms, are generally more useful. Polar compounds containing no active hydrogen are also suitable. The ethers such as dialkyl ethers and alkyl aryl ethers, are quite useful. These include diethyl ether, methylethyl ether, dipropyl ether, ethyl phenyl ether, etc. Polar halide compounds such as chloroform, carbon tetrachloride, and the like are useful. Particularly suitable are the alkyl halides, including the fluorides and bromides, such as ethyl fluoride, propyl fluoride, butyl bromides, etc.

The above and other polar compounds are capable of forming complexes with $BF_3$ in various molar ratios. Typical complexes include $H_2O:BF_3$, $2H_2O:BF_3$, $ROH:BF_3$, $ROR:BF_3$, $RCOOH:BF_3$, $2(RCOOH):BF_3$, etc., wherein R in the formulas is a hydrocarbon group such as an alkyl, aryl, alkaryl, aralkyl and the like group. In the present invention, however, the complex is not necessarily preformed before use in the catalyst system. It is necessary that both the $BF_3$ and polar compound be introduced continuously into contact with the solid oxide, and preferably a complex is not preformed before introduction of the two components. In such cases, the polar compound may be continuously introduced into the reaction zone as a separate stream or in admixture with the olefin feed. On the other hand, it may be desirable in other cases to inject the $BF_3$-polar compound complex or partial complex continuously into the zone. The metal oxide may be saturated with the complex if desired, but this does not avoid the necessity of introducing the components of the complex, either separately or as the complex, continuously during the polymerization reaction. It is essential that both the boron fluoride and the polar compound come into intimate contact with the above defined metal oxide at all times in order to obtain an active catalytic system.

The amount of polar compound added to the system has a definite bearing on the olefin conversions obtained. It is preferred that the mol ratio of boron fluoride to polar compound be maintained above about 0.1:1.0, and preferably above 0.5:1.0. Operations employing a molar excess of boron fluoride over the polar compound are particularly preferred since they generally provide much better olefin conversion and activity maintenance. The upper $BF_3$:polar compound mol ratio may be rather high such as about 5:1 or higher, but such high ratios are generally not necessary.

The choice of the particular polar compound employed will depend to a large extent upon the type of polymer to be produced. Water is generally preferred, not only from a stand-point of cheapness and availability, but also because it is conducive to the production of low molecular weight polymers suitable as gasoline components and the like. However, in producing higher molecular weight polymers, lower molecular weight aliphatic alcohols, ethers and the like will generally be suitable as polar compounds. Mixtures of two or more polar compounds may also be used.

The process is particularly applicable to operations at moderate reaction temperatures such as room temperature or even below, but the catalyst system is relatively stable up to much higher temperatures. Reaction temperatures as high as 450° F. to 550° F. are suitably employed in order to obtain high olefin conversions. The system is quite suitable for use at atmospheric pressures, although somewhat higher pressures such as 100 to 200 p. s. i. g. or much higher may be used. It will be obvious to the person skilled in the art that the selection of particular temperature and pressure conditions will depend to a large extent upon the type of olefin feed being used, the activity of the catalyst and the like.

The practice of the present invention is demonstrated in connection with the following examples which are presented without any intention of limiting the scope of the invention in any way.

EXAMPLE 1

A reaction zone was provided with a fixed bed of powdered, anhydrous titania, the reaction zone also being provided with an olefin feed inlet, $BF_3$ inlet, and effluent outlet. 95% propylene was saturated with water vapor at room temperature and atmospheric pressure and was then injected into the reactor at a rate of 1.0 liquid v./v./hr. based on the solid. $BF_3$ was continuously injected into the zone at a rate of about 25 gas v./v./hr., based on the solid. The mol ratio of $BF_3$ to water was about 1.1:1.0 during the entire run. No external heat was imposed on the reactor. In the portion of the reaction zone above the titania bed and at the point where the propylene, water and $BF_3$ came into contact, there was no reaction. There was a substantial increase in temperature in the titania bed and the highly exothermic reaction which took place over the titania bed maintained itself over an extended period of time. Liquid polymer was collected at a rapid rate.

The above run was repeated employing the same conditions except that the propylene contained no water. No reaction occurred and no polymer was formed over a period of several hours. It is seen that the metal oxide-$BF_3$ catalyst system is inactive unless a polar compound is present.

EXAMPLE 2

A steam jacketed reaction zone was provided with a fixed bed comprising a physical mixture of 20 weight percent anhydrous titania and 80 weight percent of activated charcoal, both in finely divided form. 95% propylene containing water vapor was charged through the bed at a rate of 0.5 liquid v./v./hr., and $BF_3$ was continuously charged at a rate of 9.5 gas v./v./hr. The $BF_3$ to water molar ratio was about 2.5:1.0. The reaction was started out at room temperature and rose to a temperature of about 220° F. during a 4-hour period, no external cooling being applied. The results of this run are shown in Table I, below:

*Table I*

| Reaction Time, Mins | 0-60 | 120 | 180 | 240 |
|---|---|---|---|---|
| Polymer Yield, Wt. Percent | 50 | 93 | 94 | 94 |
| Polymer Boiling Range, ° F. Initial/Final | 241/572 | 216/536 | 200/572 | 210/572 |
| Distribution of Polymer, Approx., Vol., Percent: | | | | |
| $C_9$ | 5 | 11 | 8 | 8 |
| $C_{12}$ | 12 | 11 | 9 | 12 |
| $C_{15}$ | 25 | 48 | 33 | 32 |
| $C_{18}$ | 41 | 21 | 35 | 31 |
| $C_{19+}$ | 12 | 5 | 10 | 14 |
| Bromine No. of Distillate, cgs. $Br/g$ | 72 | 73 | 73 | 72 |

It is noted that after the first hour, polymer yields, based on the olefin, were well above 90% at the high $BF_3$:water mol ratio used, and that a substantial amount of the polymer produced boiled in the gasoline boiling range.

EXAMPLE 3

This run was carried out under conditions identical with those employed in Example 2, with the exception that the fixed bed consisted only of finely divided activated charcoal. The temperature was maintained at 212° F. by means of steam passed through the jacket of the reactor. As in the run of Example 2, the reaction pressure was atmospheric. The results of this run are shown in Table II below:

*Table II*

| Reaction Time, Mins | 0-150 | 180 | 210 | 240 |
|---|---|---|---|---|
| Polymer Yield, Wt. Percent | 2 | 6 | 7 | 8 |
| Polymer Boiling Range, ° F. Initial/Final | | | 239/264 | 208/338 |
| Distribution of Polymer, Approx. Vol. Percent: | | | | |
| $C_9$ | | | 100 | 44 |
| $C_{12}$ | | | | 25 |
| Bromine No. of Distillate, cgs. $Br_2/g$ | | | 112 | 96 |

It is noted that a very low conversion of polymer was obtained throughout the 4-hour period of the run. It is seen that the system water-$BF_3$ is substantially inactive in the absence of titania under the mild conditions employed.

EXAMPLE 4

This run was carried out under conditions identical to those employed in Example 2 except that a mixed $C_3$-$C_4$ feed containing 48% olefins was employed instead of propylene. Water was introduced into the system by means of the olefin feed. The reaction was started out at room temperature and rose to a temperature of 203° F. as a result of exothermic heat evolved. The results of this run are shown in Table III below:

Table III

| Reaction Time, Mins | 0–240 | 270 | 300 | 330 | 360 | 390 |
|---|---|---|---|---|---|---|
| Polymer Yield, Wt. Percent | 52 | 67 | 69 | 77 | 78 | 86 |
| Polymer Boiling Range, °F. Initial/Final | 208/338 | 214/536 | 234/446 | 187/428 | 198/482 | 198/536 |
| Polymer Boiling in Gasoline Range, Vol. Percent | 65 | 26 | 47 | 74 | 36 | 20 |
| Distillate, cgs. $Br_2/g$ | 90 | 87 | 83 | 81 | 81 | 78 |

EXAMPLE 5

This run was conducted under substantially the same conditions as that of Example 2 except that the fixed bed consisted entirely of zirconia granules having a size of about 3 to 5 mesh. $C_3$-$C_4$ olefin feed was also used. $BF_3$ to water mol ratio was substantially the same as that employed in the run of Example 2. Olefin conversions to polymer of above about 65% were readily obtained at substantially atmospheric temperature and pressure. About 50% of the total polymer boiled below 400° F.

EXAMPLE 6

A series of runs were carried out substantially in accordance with the procedure described in Example 2 with the exception that various other finely divided solids were employed as a fixed bed in the reaction zone. In each case, propylene or mixed $C_3$-$C_4$ olefin feed containing water and boron trifluoride gas were passed over the solid bed at reaction temperatures of about 212° F. Reaction temperatures were maintained by external steam heating of the reactor. Reaction pressures were atmospheric. In a run employing Carborundum (silicon carbide) as the fixed bed and propylene feed, polymer yields of less than 24 weight percent were obtained during a 3-hour period. In a run employing finely divided Porocel (a natural alumina) and $C_3$-$C_4$ olefin feed, polymer yields of from 17 to about 30% were obtained during 4 hours of operation. Finely divided aluminum fluoride was employed with a $C_3$-$C_4$ olefin feed for a period of 4.5 hours during which time polymer yields of no more than about 30% were obtained. When employing either silica gel or activated alumina in place of titania, and using $C_3$-$C_4$ olefin feed, olefin conversions were substantially zero and no polymer was produced.

It is shown from each of the above runs and from the run employing charcoal (Example 3) that conventional adsorbents or materials containing alumina or silica in various forms are substantially inactive when used along with boron fluoride and a polar compound under mild reaction conditions. Polymer yields obtained with these materials in no case approached the high yields obtained with titania or zirconia under substantially the same conditions.

EXAMPLE 7

A run was carried out in which dehydrated powdered titania was treated with liquid boronfluoride dihydrate ($BF_3:2H_2O$) to form a composition containing about 6% by weight of the dihydrate on 94% by weight of titania. The resulting composition was then tested as a catalyst by passing a $C_3$-$C_4$ feed therethrough at a rate of 0.9 liquid v./v./hr., atmospheric pressure and room temperature. The olefin feed was substantially anyhdrous. During a period of one hour, olefin conversion was no higher than 30% and additional boron fluoride dihydrate was added to the catalyst to bring the total amount of boron fluoride dihydrate on the catalyst up to about 15% by weight. Olefin conversion remained at about 30%. Extraneous water and $BF_3$ were then charged to the reaction zone along with the olefin feed in order to provide a $BF_3$ rate of about 9.5 gas v./v./hr. and a $BF_3$:water mol ratio of about 0.8:1.0. Olefin conversion then increased to well above 80% and the run was continued for over 10 hours during which time olefin conversions of above about 70% were maintained.

It is seen from this run that the presence of water and/or $BF_3$ in the metal oxide bed does not have sufficient activity to give high olefin conversions in continuous operations. By continuously injecting water and $BF_3$ into the reaction zone, as was done in the latter portion of the run, high olefin conversion and high catalyst activity maintenance were achieved. It is also seen that $BF_3$ to water ratios of above about 0.5 are preferable in order to obtain maximum catalyst activity.

EXAMPLE 8.—EFFECT OF TYPE OF POLAR COMPOUND IN CATALYST

A reaction zone was provided with powdered titania. 95% propylene feed was passed through the reactor at a rate of about 0.5 liquid v./v./hr., atmospheric pressure and room temperature. $BF_3$ gas was concurrently passed through the reactor at a rate of about 9.5 gaseous v./v./hr. The dry propylene feed was passed through liquid ethyl alcohol at room temperature before contacting the titania bed. The resulting polymer was considerably higher in molecular weight than that resulting from polymerization of propylene saturated with water. The polymer had the consistency of light oil. This product boiled above 550° F.

In another run, a gaseous $C_3$-$C_4$ feed (48% olefin) was passed through a catalyst composition consisting of supported titania (40% on 60% activated alumina) saturated with a complex consisting of equal molar quantities of $BF_3$ and diethyl ether. The olefin feed was anhydrous. The feed rate was maintained at about 1.0 liquid v./v./hr., and reaction pressure was atmospheric. Relatively low olefin conversions of about 40% were obtained since the $BF_3$ and ether were not continuously introduced and since a molar excess of $BF_3$ over ether was not used.

What is claimed is:

1. A process for continuously polymerizing olefins which comprises the steps of providing a reaction zone containing a finely divided solid including an oxide of a left hand metal of group IV of the periodic system, said oxide comprising at least 5% by weight of said finely divided solid, continuously passing olefin feed, boron fluoride, and a polar compound into contact with said finely divided solid under polymerization conditions, and continuously withdrawing from said reaction zone an effluent comprising polymerized olefins, said polar compound being one that is capable of forming a complex with said boron fluoride and the proportions of said polar compound and boron fluoride being sufficient to form a substantial proportion of said complex.

2. A process as in claim 1 wherein said polar compound contains an active hydrogen.

3. A process as in claim 2 wherein said polar compound is water.

4. A process as in claim 2 wherein said polar compound is an aliphatic alcohol.

5. A process as in claim 1 wherein said polar compound is an aliphatic ether.

6. A process for polymerizing olefins which comprises the steps of maintaining a finely divided solid in a reaction zone, said finely divided solid including an oxide of a left hand metal of group IV of the periodic system, said oxide comprising at least 5% by weight of said finely divided solid, continuously passing olefin feed, boron fluoride and a polar compound containing an active hydrogen into contact with said finely divided solid under conditions whereby olefin polymerization takes place, and removing effluent including polymerized olefins from said zone, the $BF_3$ to polar compound molar ratio being maintained above about 0.5:1.0 during said reaction and the proportions of said $BF_3$ and polar compound being sufficient to form a substantial proportion of a complex compound thereof.

7. A process as in claim 6 wherein said metal oxide is an oxide of titanium.

8. A process as in claim 6 wherein said metal oxide is an oxide of zirconium.

9. A process for polymerizing normally gaseous olefins which includes the steps of providing a reaction zone with finely divided solid, said solid including at least 5% by weight of titania, continuously passing olefin feed into contact with said solid at a rate in the range of about 0.05 to 10 liquid volumes of olefin feed per volume of solid per hour, continuously introducing gaseous boron fluoride and water into contact with said solid, said boron fluoride being introduced at a rate in the range of about 2 to 30 volumes per volume of solid per hour, and the mol ratio of boron fluoride to water being maintained above about 1:1 and withdrawing effluent from said zone including polymerized olefins, and proportions of said boron fluoride and polar compound being sufficient to form a substantial proportion of a complex compound thereof.

10. A process as in claim 9 wherein said finely divided solid consists of a physical mixture of titania and activated charcoal.

11. A process as in claim 9 wherein said reaction is carried out at a temperature in the range of about 70° to about 500° F.

12. A process as in claim 1 wherein about 0.5 to 5 mols of said boron fluoride are present for each mol of said polar compound.

References Cited in the file of this patent
UNITED STATES PATENTS

| | | |
|---|---|---|
| 1,885,060 | Hofmann | Oct. 25, 1932 |
| 2,126,001 | Fulton et al. | Aug. 9, 1938 |
| 2,129,732 | Fulton et al. | Sept. 13, 1938 |
| 2,171,207 | Boultbee | Aug. 29, 1939 |
| 2,341,286 | Pines et al. | Feb. 8, 1944 |
| 2,404,788 | Burk et al. | July 30, 1946 |
| 2,411,483 | Wachter et al. | Nov. 19, 1946 |
| 2,656,323 | Bielawski et al. | Oct. 20, 1953 |
| 2,657,245 | Davidson | Oct. 27, 1953 |